United States Patent [19]

Suter et al.

[11] Patent Number: 5,323,011

[45] Date of Patent: Jun. 21, 1994

[54] FIBER OPTIC IONIZING RADIATION DETECTOR

[75] Inventors: Joseph J. Suter, Columbia; Jay C. Poret, Baltimore, both of Md.

[73] Assignee: The Johns Hopkins University, Baltimore, Md.

[21] Appl. No.: 106,669

[22] Filed: Aug. 16, 1993

Related U.S. Application Data

[63] Continuation-in-part of Ser. No. 787,334, Nov. 4, 1991, abandoned.

[51] Int. Cl.⁵ .......................... G01T 1/00; G01T 1/06
[52] U.S. Cl. .................... 250/474.1; 250/368
[58] Field of Search ............... 250/472.1, 473.1, 474.1, 250/368

[56] References Cited

U.S. PATENT DOCUMENTS

4,232,228 11/1980 Reich et al. ................ 250/341 X

FOREIGN PATENT DOCUMENTS

| 53-89793 | 8/1978 | Japan | 250/474.1 |
| 60-179680 | 9/1985 | Japan | 250/474.1 |
| 61-108986 | 5/1986 | Japan | 250/474.1 |
| 61-167892 | 7/1986 | Japan | 250/474.1 |
| 62-174678 | 7/1987 | Japan | 250/474.1 |

*Primary Examiner*—Constantine Hannaher
*Assistant Examiner*—Edward J. Glick
*Attorney, Agent, or Firm*—Francis A. Cooch; Eugene J. Pawlikowski

[57] ABSTRACT

An ionizing radiation detector employs optical fibers as the medium for sensing ionizing radiation emitted by a radioactive source. Light in the infrared region is pumped continuously through an optical fiber located in an area or region where the unintentional discharge of ionizing radiation may be expected, so that such emission is detected the moment it occurs. The source of optical light emits a constant output within a specific wavelength band which changes only when irradiation of the fibers by ionizing radiation causes their internal color centers to change. The output of the fibers is optically coupled to a photomultiplier via a light pipe. A single light source, detector, and associated electronics complete the system. A hand-held unit unique for remote sensing may house these components. Due to safety conditions, these components are located at a point remote from the position liable to become under the influence of the radiation exposure field. Annealing of that portion of the optical fiber influenced by irradiation field restores the exposed portion of the optical fiber to substantially its previous level of sensitivity thereby reversibly establishing the fiber optic for any subsequent exposure. In response to particle bombardment from a cobalt-60 source, the detector reacts to the energy remaining after passage of the beam through a shielding enclosure, thereby giving a reliable indication of the shielding effectiveness of the enclosure.

15 Claims, 10 Drawing Sheets

FIG. 7

| Element | At. # | Density | Exp. μ/ρ | Hubble μ/ρ | Slope | Windings |
|---|---|---|---|---|---|---|
| Al | 13 | 2.7 | 5.34E-03 | 5.50E-02 | 0.988 | 100 |
| Cu | 29 | 8.96 | 5.16E-03 | 5.288E-02 | 0.962 | 100 |
| Cu-Gr (40%C, 60%Cu) | | 5.67 | 5.33E-03 | 5.45E-02 | 0.975 | 100 |
| Pb | 82 | 11.34 | 7.41E-03 | 6.28E-02 | 0.932 | 100 |
| Pb | 82 | 11.34 | 1.35E-03 | 6.28E-02 | 0.880 | 150 |
| Pb | 82 | 11.34 | 1.75E-03 | 6.28E-02 | 0.847 | 200 |
| Pb | 82 | 11.34 | 2.34E-03 | 6.28E-02 | 0.801 | 250 |
| Pb | 82 | 11.34 | 5.20E-02 | 6.28E-02 | 0.605 | 550 |

Units:
Density—gm/cc
μ/ρ—m$^2$/kg

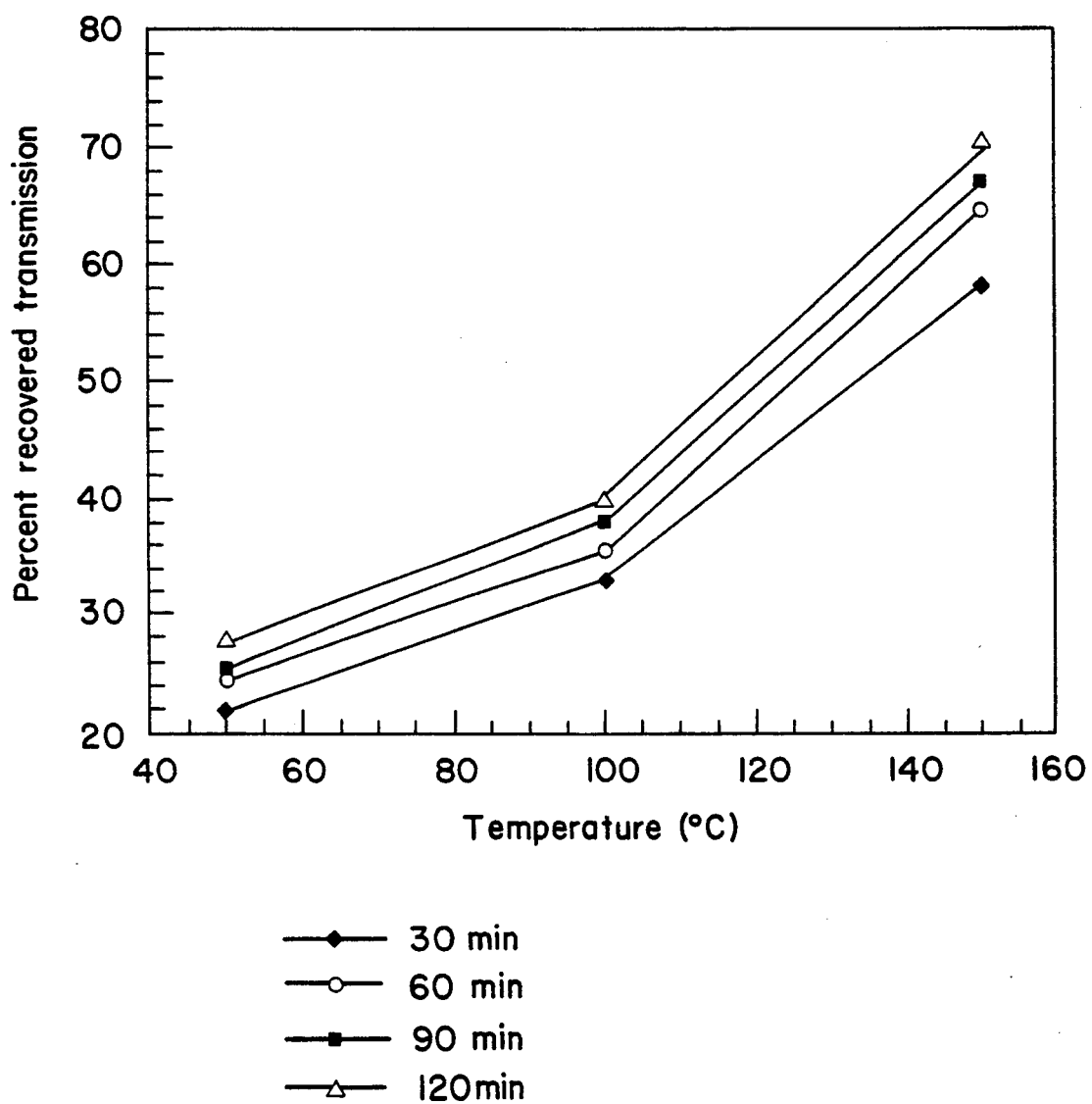

FIBER OPTIC IONIZING RADIATION DETECTOR

STATEMENT OF GOVERNMENTAL INTEREST

The Government has rights in this invention pursuant to Contract No. N00039-89-C-5301 awarded by the Department of the Navy.

This is a continuation-in-part of U.S. Ser. No. 07/787,334, filed Nov. 4, 1991, now abandoned.

BACKGROUND OF THE INVENTION

1. Field of the Invention

This invention relates to a new type of sensor for detecting ionizing radiation and, in particular, the invention describes a radiation sensor which employs optical fibers as the sensing medium. The device may be employed in environments considered hazardous to human life or safety due to excessive leakage or dangerous concentrations of ionizing radiation. Measurement of the shielding characteristics of enclosures by determining their mass attenuation coefficients is another desirable application of the present invention.

DESCRIPTION OF THE PRIOR ART

2. Description of the Prior Art

Devices have been known in the past for signalling in response to radiant energy received from a remote area being monitored. Several problems associated with such detectors has been their complexity and relatively high cost. Bulk is another concern when size and concealment became major factors in the design. The need to have convenient physical access to the device also may be an important consideration.

Radioactive measuring systems consist generally of (i) a radiation detector, or transducer, in which radiation energy is converted into electrical, optical or thermal energy or into energy of chemical change, and (ii) the electrical, electronic, or other instrumentation by means of which the magnitude of these effects in detectors may be determined. Essentially, such devices for their operation depend upon the corpuscular or electromagnetic radiation from nuclei, whether it be $\alpha$, $\beta$, or $\gamma$, interacting with matter by imparting energy to two atoms by a process of particle separation commonly called ionization.

One such device is disclosed in U.S. Pat. No. 4,931,646 which relies on the scintillation effects of fiber optics as a consequence of their exposure to gamma and neutron sources. As explained in the patent, a plurality of scintillation fiber sensors is arranged in a line detector several meters in length. Each of the scintillator fiber sensors is fabricated from different inner and outer core materials differing in index of refraction to have a different spectral sensitivity with regard to gamma and neutron radiation. Due to their different scintillation core materials, the fiber sensors carry out particle and energy discrimination to determine whether an incident particle flux is comprised of gamma rays or fast neutrons and the relative energy of any gamma rays. The optical radiation generated in each of the scintillation fiber sensors may be transmitted over some distance, given in terms of several kilometers.

Light collection apparatus plays an important part in U.S. Pat. No. 3,987,301 for detecting the presence of extraneous matter and/or cracks in translucent containers in which a spot beam of light is projected through the container to generate an electrical inspection signal passing through the container to a fiber optic light collection panel.

One other construction for an optical fault locator is shown in U.S. Pat. No. 5,008,545 to Anderson et al, in which a single mode fiber examination is the objective. The patented arrangement has a high power, short wavelength optical source, such as an 850 nm laser diode, that generates optical power in the form of narrow optical pulses to a single mode fiber under test.

Another arrangement using optical fibers is seen in U.S. Pat. No. 5,012,087 as part of a safety system wherein optical energy leakage from a laser powered transmitting fiber is detected by monitoring the output of a photosensitive diode.

Although generally satisfactory results are achieved from the exemplary prior art systems, their main purpose and appeal essentially lies in employing optical fibers in conventional fashion for the efficient transmission of light.

SUMMARY OF THE INVENTION

The invention comprises a remote radiation sensor and tester employing optical fibers as the sensing medium. Thus, rather than employ optical fibers merely to transmit light, the device depends for its operation on changes in optical intensity in the fibers as a function of radiation level. Accordingly, in one application of the invention, shielding effectiveness as a function of various levels of gamma radiation for metal, and metal-matrix composites, is measured by employing optical fibers as the radiation sensor. In another application, the invention can be incorporated in a hand-held miniature radiation sensor for indicating excessive radiation levels at protected environments located a considerable distance from human attendants. As an additional inventive feature, the optical fibers may be annealed after each exposure so as to recover a substantial amount of the original optical intensity that existed prior to irradiation.

Accordingly, an object of the invention is to detect the emission of ionizing radiation promptly and decisively upon its emergence in a controlled environment.

Another object of the invention is to derive from a fiber optic element a real time indication that it is being subjected to emission from a source of ionizing radiation.

A further object of the invention is to safeguard the health of supervisory personnel whose responsibility it is to detect the unexpected and harmful leakage from a source of ionizing radiation.

It is a further object of the invention to restore an optical fiber exposed to ionizing radiation in the direction of its original state by subjecting it to annealing subsequent to each exposure to the radiation.

Yet a further object of the invention is to determine the degree of impermeability of a member exposed to ionizing radiation using an optical fiber as the sensing element.

Other objects of the invention will become apparent from the following detailed description of several embodiments of the invention when taken in conjunction with the accompanying drawings, wherein similar reference characters refer to similar parts in each of the views.

BRIEF DESCRIPTION OF THE DRAWINGS

FIG. 7 is a tabulation of experiments carried out for various shielding metals in which the observed results show a close correlation to theoretical values.

FIG. 10 is a graph which shows the recovery in optical intensity of a 100 winding fiber when subjected to various temperatures for four different periods.

DESCRIPTION OF THE PREFERRED EMBODIMENT

Figure 1:
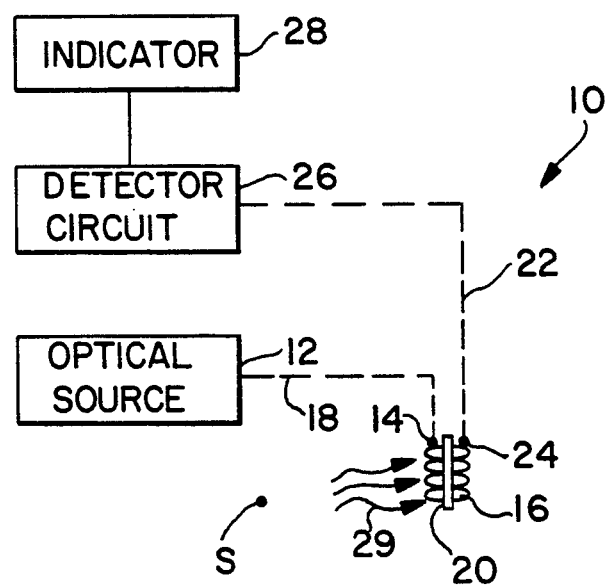
FIG. 1 is a functional block diagram of the ionizing radiation detector embodying the invention.

Referring to the diagrammatic view in FIG. 1, the remote, real time ionization radiation detector embodying the invention is generally designated by the reference character 10. An infrared radiation source 12 is coupled to the input 14 of a radiation sensitive multimode optical fiber 16 by means of an optical link 18. The fiber 16 is wound about and/or supported by a rod 20 disposed in close proximity to a source S of ionizing radiation. A second optical link 22 couples output 24 of optical fiber 16 to a detector circuitry 26 which contains conventional components to electrically, electronically, or by other means known to those skilled in the art convert the light passed by fiber 16 into a useable signal. An appropriate display of the output of detector circuit 26 is provided by an indicator 28. Standard commercially available detector and indicator components are widely available to accommodate the design choices of the technician.

Source S is under constant observation to guard against the emission of dangerous dosages of ionizing radiation illustrated by the rays 29. Under normal operating circumstances, the source S is benign in the sense that no leakage or escape of ionizing radiation affects the passage of light through the optical fiber 16. As such, the light passing between the optical source 12 and detection circuitry 26 is uninterrupted as well as constant in amplitude.

The optical fiber 16 may comprise a coiled 50-125 multimode optical fiber. Should the fiber 16 be irradiated by the source S, the atomic structure of the optical fiber will change due to the creation of stable, room temperature color centers. These defects occur in response to particle bombardment by the rays 29 and are created by the destruction of glass bonds due to the effect of high energy photons. The change in optical energy due to the effect of the rays 29 is established by detector circuitry 26 and appropriately displayed by indicator 28.

It will accordingly be understood, according to the invention, that the interaction of the ionizing rays 29 with the optical fiber 16 during a time of emission by the source S results in a change in optical intensity in the fibers 16 as a function of the level of radiation. This change is then correlated in detector circuitry 26 with a specific exposed dose, having a 5.0% reproduceability. It has been found that the embodiment according to FIG. 1 can predict the total exposed dose over a period time for gamma irradiation with a range of 10-100 kRad[Si].

Figure 2:
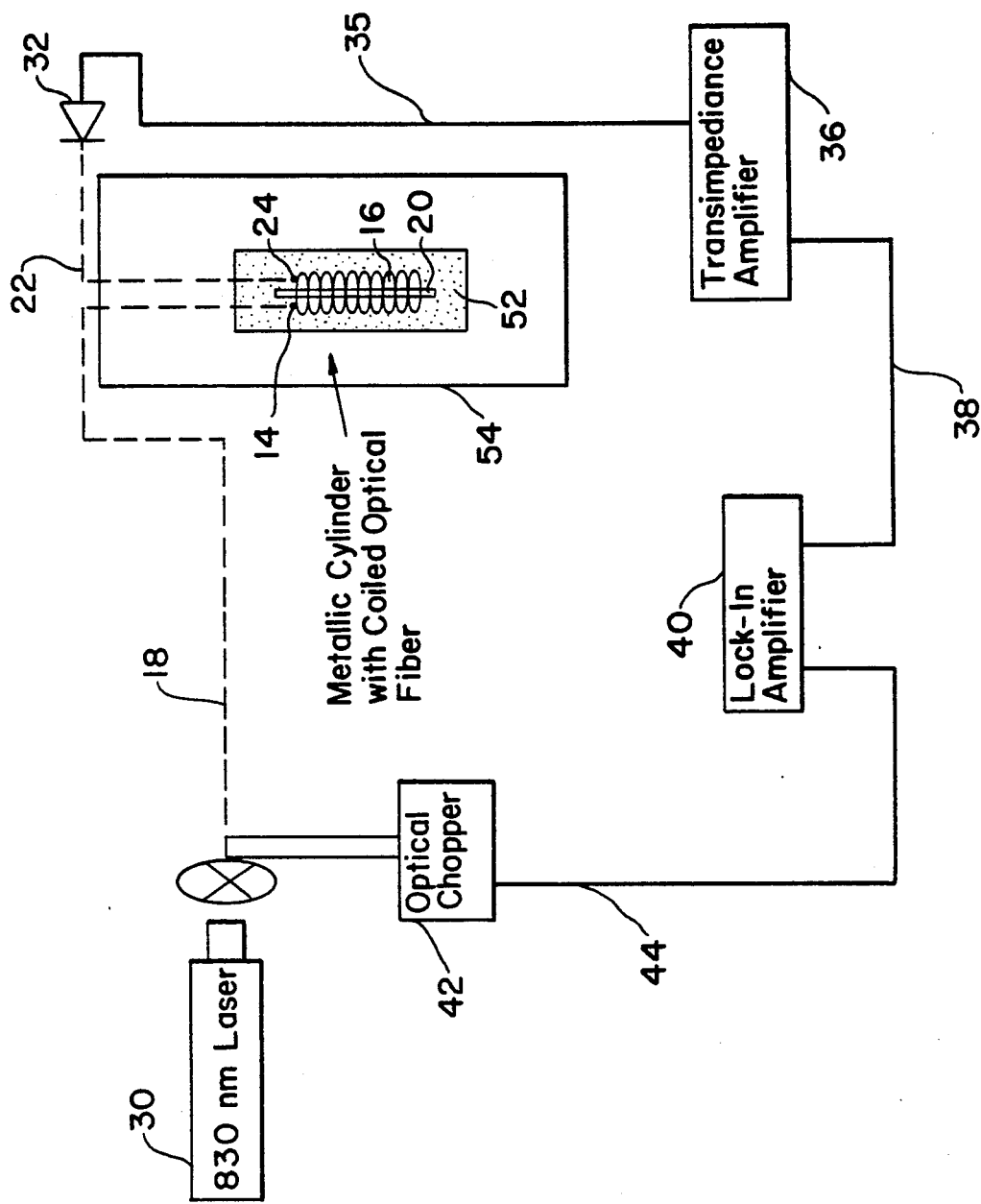
FIG. 2 shows the radiation detector of FIG. 1 applied to a system for measuring the mass attenuation coefficient of materials by employing coiled optical fibers and using a laser diode as the optical source.

Referring now to FIG. 2, which is a schematic diagram of an arrangement to measure optical attenuation of coiled optical fibers, the ionizing radiation detector of FIG. 1 is arranged to measure the attenuation characteristics of materials using a 830 nm laser 30 as the source of optical radiation. As seen in FIG. 2, and as described above in connection with FIG. 1, the device detects changes in optical fibers as a function of radiation level of an ionizing source. As shown, laser 30 emits light at a wavelength of 830 nm into one end of an optical fiber 16 via an optical link 18 connected between source 30 and a point 14 at the input of fiber 16. The output at the other end of optical fiber 16 passes from a point 24 over optical link 22 to an unbiased silicon photodetector 32 used to measure the optical signal from the output end of fiber 16. A photodetector selected for this purpose may have an active area of 0.44 cm$^2$ and a responsivity of 0,504 amps/watt at 840 nm.

The electrical output of the photodetector 32 is applied on line 35 to an amplifier 36 and then applied over line 38 to a lock-in amplifier 40.

In order to use the lock-in amplifier 40, the light input to optical fiber 16 is optically modulated by an optical chopper 42 connected by line 44 to amplifier 40 and operating at a frequency of approximately 280 Hz.

Figure 3:
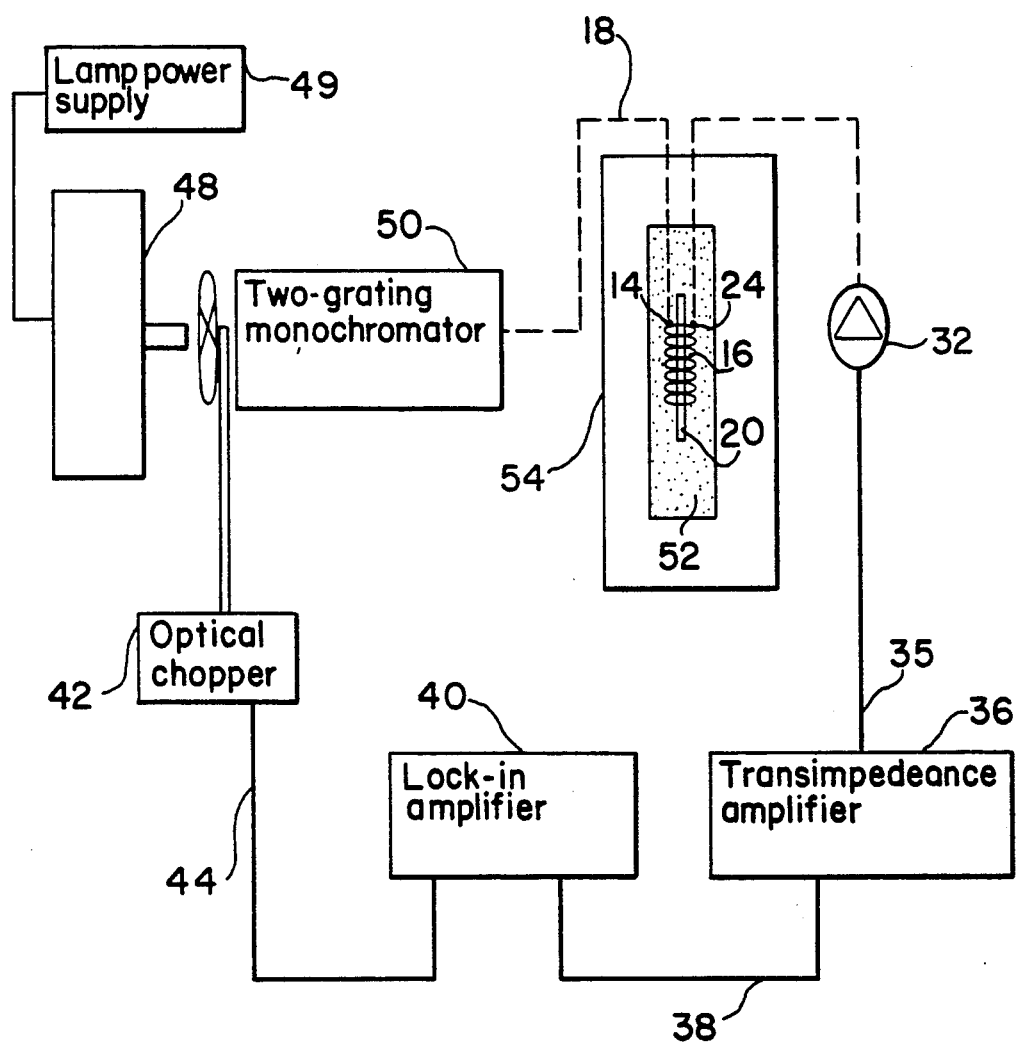
FIG. 3 shows a radiation detection system of FIG. 1 adapted to measure the mass attenuation coefficient of materials by employing coiled optical fibers and using a monochrometer as the optical source.

In FIG. 3 there is shown in schematic form the ionizing radiation detector of FIG. 1 in an alternative arrangement for measuring the mass attenuation coefficient of materials. As shown in FIG. 3, optical signals are generated in optical fiber 16 using a xenon lamp 48 powered by a supply 49. As described above in connection with FIG. 1, the device shown in FIG. 3 functions to detect changes in optical fibers as a function of radiation level. Incoherent light from lamp 48 is mechanically chopped by chopper 42 into a two-grating monochromator 50. In monochrometer 50, the light is focused into the optical link 18 and hence coupled to the input 14 of optical fiber 16. As is well known to those skilled in the art, the monochrometer is tunable to a wavelength in the infrared range, such as 840 nm, to obtain maximum passage of optical energy through optical fiber 16. Photodetector 32 measures the optical signal from the output 24 of optical fiber.

Both the embodiments shown in FIGS. 2 and 3 have in common with each other the interconnecting components represented by the amplifiers 36 and 40 in series between the photodetector 32 and the optical chopper 42.

Shielding effectiveness as a variation of various levels of gamma radiation for metal and metal-matrix composites may advantageously be measured by employing the optical fiber 16 shown in the FIG. 2 and FIG. 3 embodiments as a radiation sensor. To this end, the optical fiber 16 is inserted inside different ones of metallic cylinders 52, such as copper, lead and aluminum. The shielding effectiveness of the cylinders 52, measured in terms of a mass attenuation coefficient, is determined by inserting the cylinder 52 inside an ionizing radiation source 54, such as cobalt-60, shown in FIGS. 2 and 3 so as to form an optically tight housing for the fiber 16 with the exception of the connections to its inputs and outputs 14 and 24, respectively. The core of the fiber 16 in the experiments may have a graded index profile with a diameter of 50 μm, a cladding diameter of 125 μm, poller jacket diameter of 250 μm, and a numerical aperture of 0.20. The optical loss as reported for the commercial grade glass used was approximately 2.42 dB/km at 850 nm. The diameter of the rod was 0,706 cm and the cobalt-60 source 54 operated with a dose rate of 0.818 kRad/min.

Figure 4:
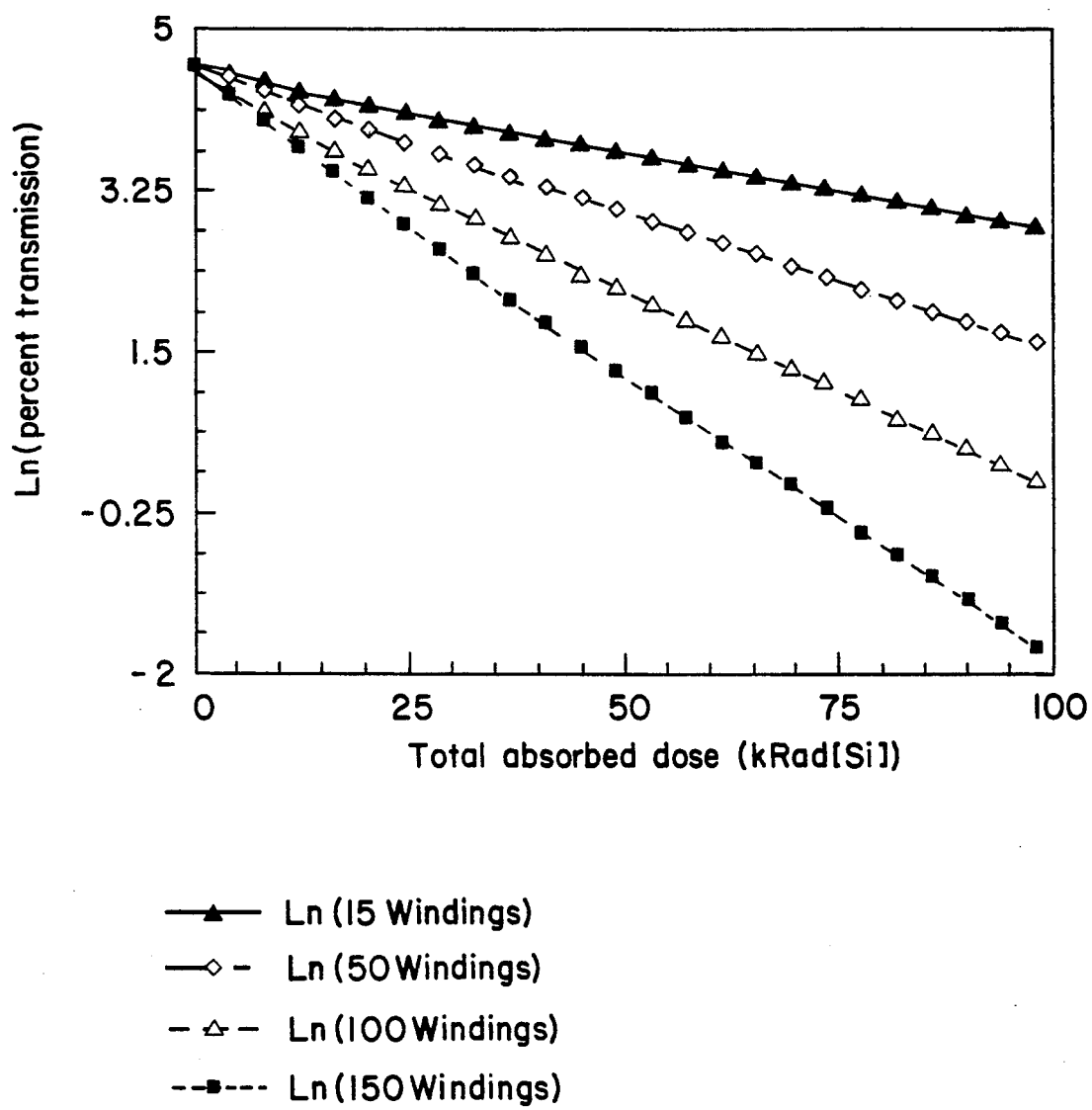
FIG. 4 is a graph which shows the results of irradiating an optical fiber for a variety of windings and comparing the resulting optical intensity of the fiber to the total absorbed dose.

In operation, whether using the laser 30 of FIG. 2 or the xenon source 48 of FIG. 3 as the light source, the fiber 16 is first exposed to cobalt-60 source 54 without the benefit of any shielding offered by the cylinder 52. FIG. 4 shows the results of the initial aspect of the measurement procedure using nothing to impede the intersection of the rays 29 with the fiber 16. Curves in logarithmic terms comparing the present transmission of light through the fiber 16 versus the levels of irradiation measured in the range 0–100 kRad[Si] are given for four coil configurations of 15, 50, 100, and 150 windings each. The transmission properties of the fiber 16 is shown to be inversely proportional to the level of radiation intensity. Similarly, the larger the number of windings placed around the rod 20 the smaller the amount of light yielded by the fiber 16 for the same total absorbed dose of radiation.

It will be understood that the notation based on kRad[Si] is a standard, conventional, and universally accepted method of expressing an observed dose of radiation measured in kRads using the absorbed dose in silicon as a reference.

Figure 5:
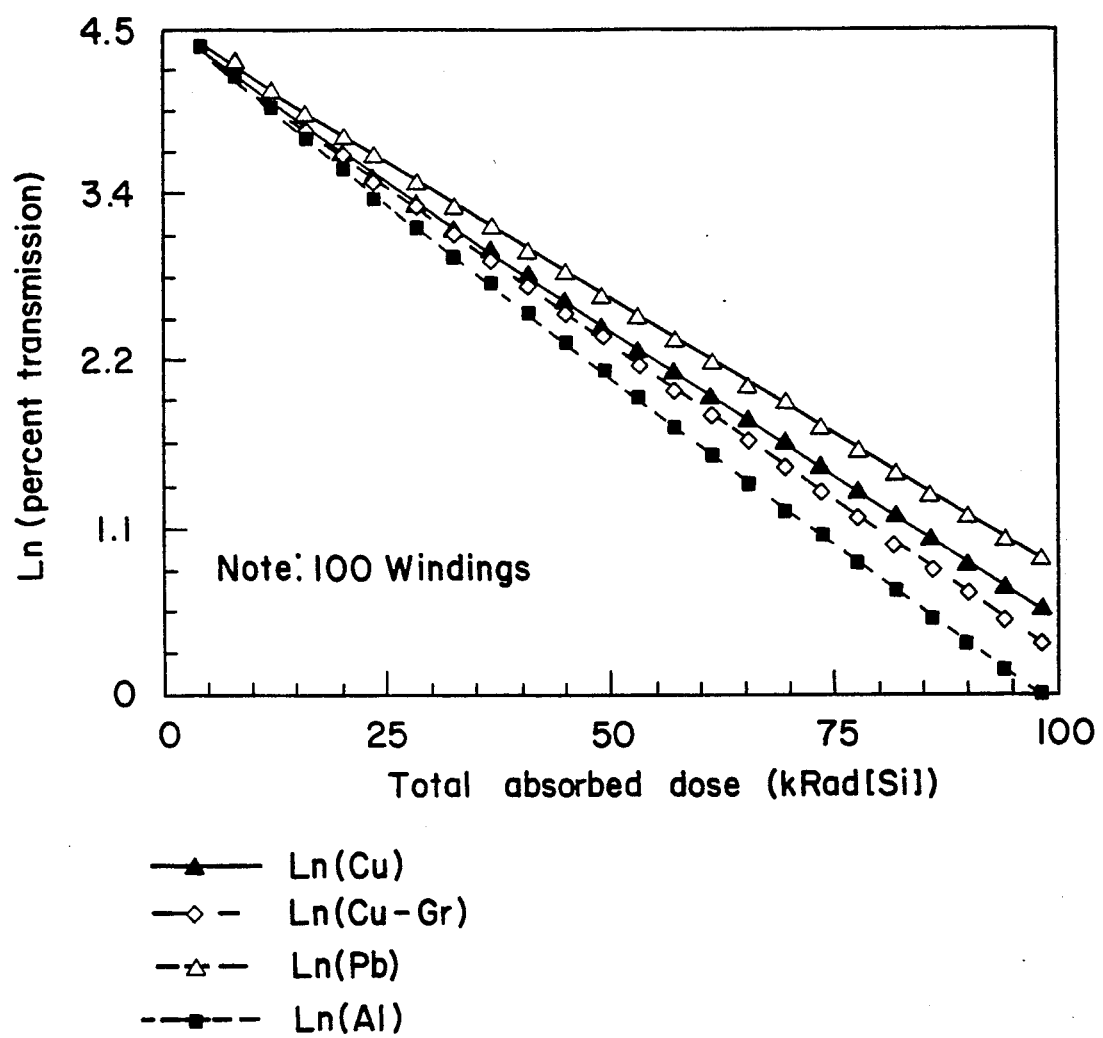
FIG. 5 is a graph which compares the optical intensity of a one-hundred turn optical fiber in terms of the total absorbed dose when shielded by various metals.

Once having been placed in one of the metallic cylinders 52, and while being exposed to bombardment of the cobalt-60 source 54, the experiment is repeated for consecutive samples of fiber 16 to obtain the percentage of transmission of light passed by the fiber while using various shielding materials such as Cu, Cu-Gr, Pb, and Al. Using a coiled fiber 16 of 100 windings, it can be seen from FIG. 5 that the curves for the four identified metals diverge as the radiation intensity from the source 54 increases within the range 0–100 kRad[Si].

Radiation detection measurements employing the present invention have revealed a decrease in optical intensity in the fiber 16 given by $I = I_0 \exp[-\alpha t + (\mu/\rho)\rho x]$, I is the percent transmission of optical intensity which passes through the fiber after it is irradiated, $I_0$ is the percent transmission of optical intensity which passes through the fiber before it is irradiated, t is the total absorbed dose of radiation, x is the thickness of the shielding material, α is the fiber radiation response coefficient, $\mu/\rho$ is the mass attenuation coefficient, and ρ is the shielding material density. The mass attenuation coefficient of lead, copper, aluminum and copper graphite were determined with respect to their respective theoretical values.

Figure 6:
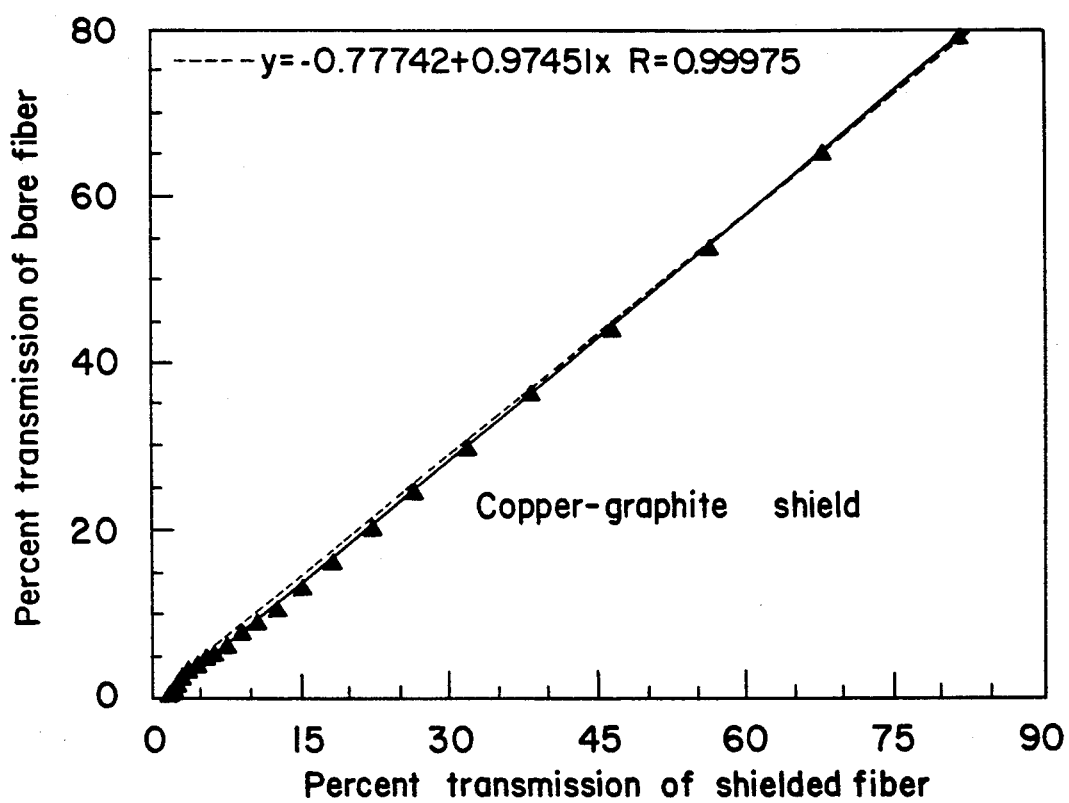
FIG. 6 is a graph which for a copper-graphite-shielded optical fiber shows the percent transmission of bare fibers versus percent transmission of a shielded fiber of one hundred windings.

Referring to FIG. 6, which plots the observed results of a copper graphite-shielded optical fiber, the method employed as described above is to plot the response of the bare fiber versus a shielded fiber. Stated differently, all materials will have some capacity to absorb ionizing radiation at some particular energy level. In the case of gamma irradiation from a $Co^{60}$ source, the photon energy is 1.25 MeV. The numerical quantity used to compare shielding effectiveness of various material to each other is called the mass attenuation coefficient. A theoretical value of the mass attenuation coefficient has been calculated for many different materials at varying photon energies. In accordance with the invention, the data generated shows that the mathematical technique presented is a valid method for computing this quantity by comparing the known theoretical values to those determined using this method.

The experiments for copper graphite yield a linear fit with near perfect regression coefficients ($R > 0.99$). Once the results are plotted, as in FIG. 6, the slope of the line will, with a slight amount of mathematical manipulation, yield the mass attenuation coefficient for the metal. Thus, by way of reiteration, the mass attenuation coefficient is calculated by plotting the percent optical transmission of the unshielded fiber to the percent transmission of the shielded fiber. When these two sets of data are examined graphically, a linear relationship is observed to exist between these two quantities. The slope of this straight line is then used to compute the mass attenuation coefficient of the shielding material.

Refer to FIG. 7 for a tabulation of mass attenuation coefficient experiments for various metals shown as a list of materials and their various slopes. Showing a precise correlation with the results achieved in FIG. 6 with an optical fiber coil having 550 windings, the last entry shown in FIG. 7 confirms that when using a lead-shielded fiber of 550 windings the experimental mass attenuation coefficient of 5.20E-02 m²/kg approaches the theoretical value of 6.28E-02 within 16%.

The ionizing radiation detector described hereinabove, has shown a potential to be made reusable by heating the optical fiber 16 after each exposure to ionizing radiation. The effect of thermal energy is to remove the color centers formed during irradiation by a diffusional process in which trapped electrons can move into a low energy position in the glass matrix as opposed to the high energy position which form during exposure to high energy gamma irradiation. Initial experiments have shown that heating fiber 16 to 150° C. can recover as much as 60% of the original optical intensity before irradiation.

Figure 8:
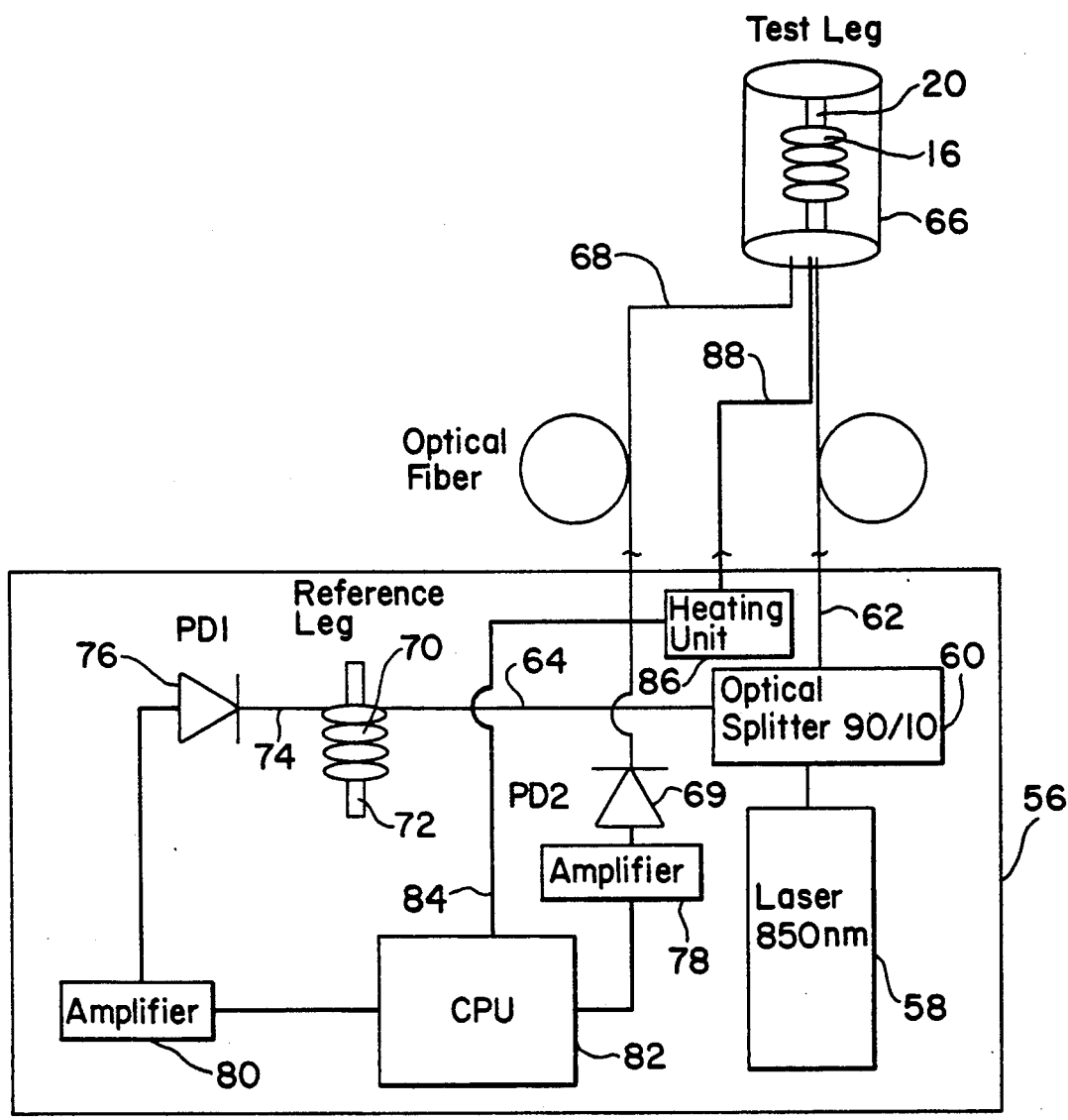
FIG. 8 is a schematic diagram of a hand-held test unit for the remote detection of ionizing radiation.

Accordingly, the function of the ionizing radiation detector shown in FIG. 8 is to recapture as much as possible the original transmissivity of the optical fiber 16 subsequent to the time it has been exposed to ionizing radiation.

As shown in FIG. 8, the reference character 56 designates a housing or container for a laser 58. Light from laser 58 is applied to a 90/10 optical splitter 60 of conventional design. In the design chosen, light into the splitter 60 is divided unequally and applied to an operating path 62 and a reference path 64. The optical fiber 16 may be enclosed in a housing or casing 66 some distance from the housing 56, but, in any event, at least 10% of the light from splitter 60 is fed to fiber 16 over path 62. The return of this light from fiber 16 is accomplished by means of an optical link 68 connected to the input of a photodetector 69. As will be appreciated, photodetector 69 produces an electrical signal proportional to the intensity of the light traversing fiber 16.

The reference path 64 in the housing 56 is connected to a reference optical fiber 70, wound about a rod 72, and coupled by a link 74 to a photodetector 76, the function of which will readily be understood. Thus, an electrical signal representative of approximately 90% of the light divided by optical splitter 60 appears at the output of photodetector 76. By means of amplifier 78 and 80, the photodetectors 69 and 76 outputs are applied to a CPU 82, the output of which, by means of line 84, is applied to heating unit 86 connected by means of line 88 to the rod 20 on which the fiber 16 in casing 66 is supported.

During operation of the detector shown in FIG. 8, the return signal from the fiber 16 is continuously compared by CPU 82 with the reference signal on path 64. Any variation in the output of CPU 82 from a calibrated setting will be interpreted as a real time indication that the optical fiber 16 is being subjected to ionizing radiation of such intensity that its transmission characteristics are being altered thus immediately raising the need for an alarm of a potentially hazardous development at the location of the casing 66. By heating the optical fiber 16 after irradiation, the color centers formed during irradiation may now move into low energy positions in the glass matrix as opposed to the high energy positions which formed during exposure to high energy gamma radiation. The present invention thus advantageously obviates the need to repair or replace the optical fiber 16 following each exposure to ionizing radiation.

Figure 9:
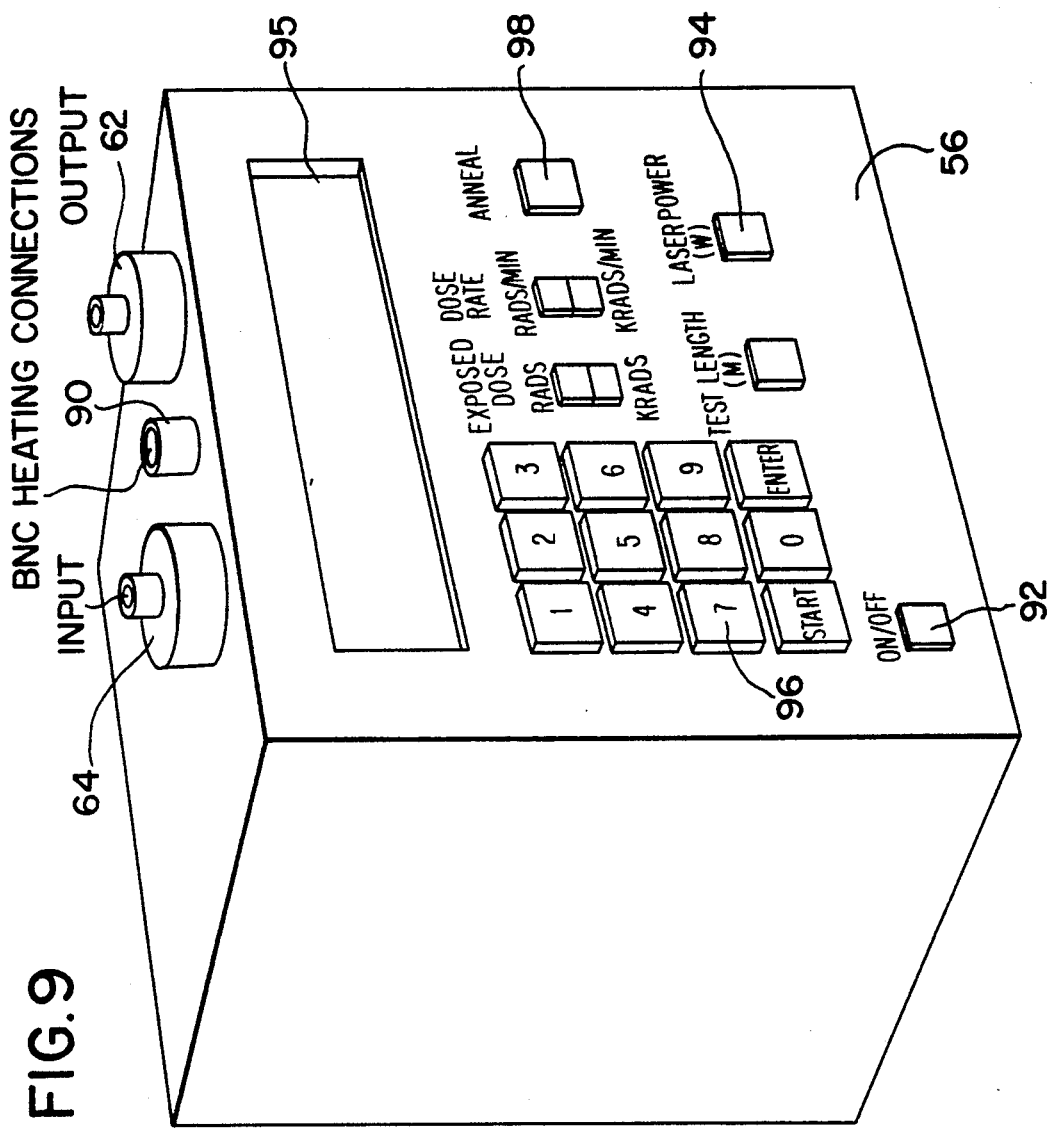
FIG. 9 is a perspective view of a housing which integrates the elements of the radiation test unit shown schematically in FIG. 8.

The fiber optic ionization radiation detector as shown in FIG. 8 lends itself easily to an integrated unit on which the detecting fiber optic element can be located hundreds of feet or even kilometers from the actual site under observation. Such an integrated unit is shown in FIG. 9 in the form of the housing 56 at the top of which input and output connections 64 and 62, respectively, are adapted for connection to the externally located fibers which extend to the casing 66. The heating connection in FIG. 9 is shown by the reference character 90.

Various controls on the face on the hand-held unit include an on/off switch 92, a laser power switch 94, a digital panel 95, a numerical touch pad 96, and various exposure level and duration controls which enable the operator to remotely monitor the condition of the optical fiber 16.

Also mounted in conventional fashion on the face of the housing 56 is a control 98 by which the electrical current imparted by the heating unit 86 shown in FIG. 8 may be energized so as to apply to the optical fiber 16 at the test leg a current which anneals it into a condition from which it may again responsibly detect any exposure to ionizing radiation.

Refer now to FIG. 10 for an explanation of the results achieved while annealing an optical fiber comprised of 100 turns. The curves shown depict total annealing times for four experiments conducted at 30, 60, 90, and 120 minutes. Initially, prior to any annealing, the optical fiber is exposed to 46.81 kRad[Si]. The average optical transmission of the fiber after being irradiated, but prior to heat treatment, was 10.09±0.56%. After annealing of the fiber optic for the times shown, the percentage of recovered transmission improved significantly. For example, a fiber sample irradiated at 46.81 kRad[Si], and subsequently exposed to a temperature of 100° C., began to transmit light at 40% of its pre-irradiated level, thus resulting in a recovery of approximately 30% of transmissive ability without having to disturb the test fiber in its location. For the same length of annealing time, but at a much higher temperature, experiments have shown that heating the fibers to 150° C. can recover as much as 60% of the original optical intensity which existed before irradiation.

The above and other features of the present invention are illustrative only of preferred embodiments of the present invention, and it is clear that a variety of modifications and changes may be made without departing from the scope of the appended claims.

We claim:

1. An ionization radiation detector comprising:
   a radiation sensitive optical fiber coiled around a rod; said optical fiber having input and output ends;
   a source of light;
   means for passing light from said source into the input end through said optical fiber;
   a source of ionizing radiation for irradiating said optical fiber;
   means for shielding said optical fiber from said ionizing radiation;
   and means for measuring the mass attenuation coefficient of said shielding means as a function of the intensity of the light arriving at the output end of said optical fiber in response to said irradiation.

2. A detector as set forth in claim 1, wherein the wavelength of said light is 840 nm.

3. A detector as set forth in claim 1, wherein said light passes through said optical fiber to said measuring means substantially unattenuated in the absence of irradiation from said source of ionizing radiation.

4. A detector as set forth in claim 1, wherein said optical fiber has a graded index profile with a diameter of 50 μm, a cladding diameter of 125 μm, polymer jacket diameter of 250 μm, and a numerical aperture of 0.20.

5. A detector as set forth in claim 1, wherein the diameter of said rod is 0.706 cm.

6. An ionization radiation detector comprising:
   a radiation sensitive optical fiber coiled around a rod; said optical fiber having input and output ends;
   a source of light;
   means for passing light from said source to the input end of said optical fiber thereby providing a first signal at the output end of said optical fiber;
   first photodetector means responsive to said first signal;
   a source of ionizing radiation for irradiating said optical fiber;
   a reference path simultaneously receiving light from said source;
   second photodetector means in said reference path for producing a second signal indicative of the intensity of light in said reference path;
   central processing unit means for comparing the output of said first photodetector means and said second signal;
   and means controlled by said central processing unit means for annealing said optical fiber after irradiation thereby making it reusable.

7. A detector as set forth in claim 6, wherein the wavelength of said light is 840 nm.

8. A detector as set forth in claim 6, wherein said light passes through said optical fiber to said first photodetector means substantially unattenuated in the absence of irradiation from said source of ionizing radiation.

9. A detector as set forth in claim 6, wherein said optical fiber has a graded index profile with a diameter of 50 μm, a cladding diameter of 125 μm, polymer jacket diameter of 250 μm, and a numerical aperture of 0.20.

10. A detector as set forth in claim 6, wherein the diameter of said rod is 0.706 cm.

11. A method for measuring the mass attenuation coefficient of various materials comprising the steps of:

passing light into a radiation sensitive optical fiber coiled around a rod;

exposing said optical filter to a source of ionizing radiation;

placing said optical fiber into a metallic shield whose mass attenuation coefficient is being measured;

again exposing said optical filter to said source of ionizing radiation through the wall of said shield; and calculating the mass attenuation coefficient of said shield by plotting the percent of optical transmission of said optical fiber when unshielded to the percent of optical transmission of said optical fiber when shielded.

12. The method according to claim 11, wherein said shield is in the form of a cylinder.

13. The method as recited in claim 11, wherein the wavelength of said light is 840 nm.

14. The method as recited in claim 11, wherein said optical fiber has a graded index profile with a diameter of 50 μm, a cladding diameter of 125 μm, polymer jacket diameter of 250 μm, and a numerical aperture of 0.20.

15. The method as recited in claim 11, wherein the diameter of said rod is 0.706 cm.

* * * * *